United States Patent [19]

Cook

[11] Patent Number: 4,746,263
[45] Date of Patent: May 24, 1988

[54] VEHICLE BUMPER STORED CRANE HOIST

[75] Inventor: Larry D. Cook, Shawnee, Okla.
[73] Assignee: Jo Ellen Watson, Shawnee, Okla.
[21] Appl. No.: 929,578
[22] Filed: Nov. 10, 1986
[51] Int. Cl.⁴ .......................... B60P 1/00; B60P 1/04
[52] U.S. Cl. .................................... 414/543; 414/540; 414/549; 212/189; 293/117
[58] Field of Search ............... 414/540, 542, 543, 546, 414/547, 550, 555, 539, 541; 212/182, 187, 189; 293/106, 117; 224/42.03 R

[56] References Cited

U.S. PATENT DOCUMENTS 4,127,295 11/1978 Robinson ............................ 293/117
4,419,038 12/1983 Pendergraft ........................ 414/543

FOREIGN PATENT DOCUMENTS 0089614 9/1983 European Pat. Off. ............ 293/117
3442578 6/1986 Fed. Rep. of Germany ...... 414/540
318981 12/1969 Sweden ................................. 212/189

Primary Examiner—Robert J. Spar
Assistant Examiner—Vien Nguyen
Attorney, Agent, or Firm—Robert K. Rhea

[57] ABSTRACT

A telescoping hoist assembly normally stored in the rear bumper area of a pickup truck includes a boom telescoping into and out of a mast pivotally anchored at one end of the pickup bumper structure. A power winch operated by the pickup electrical energizer is axially mounted on the outward end of the boom. With boom extended out of the mast the cable is connected with the anchored area of the mast for a hoist self erecting action interrupted, when the mast is vertical, by stop members at the base end of the mast. A mast stored jack structure supports hoist loads independently of the pickup suspension system.

6 Claims, 4 Drawing Sheets

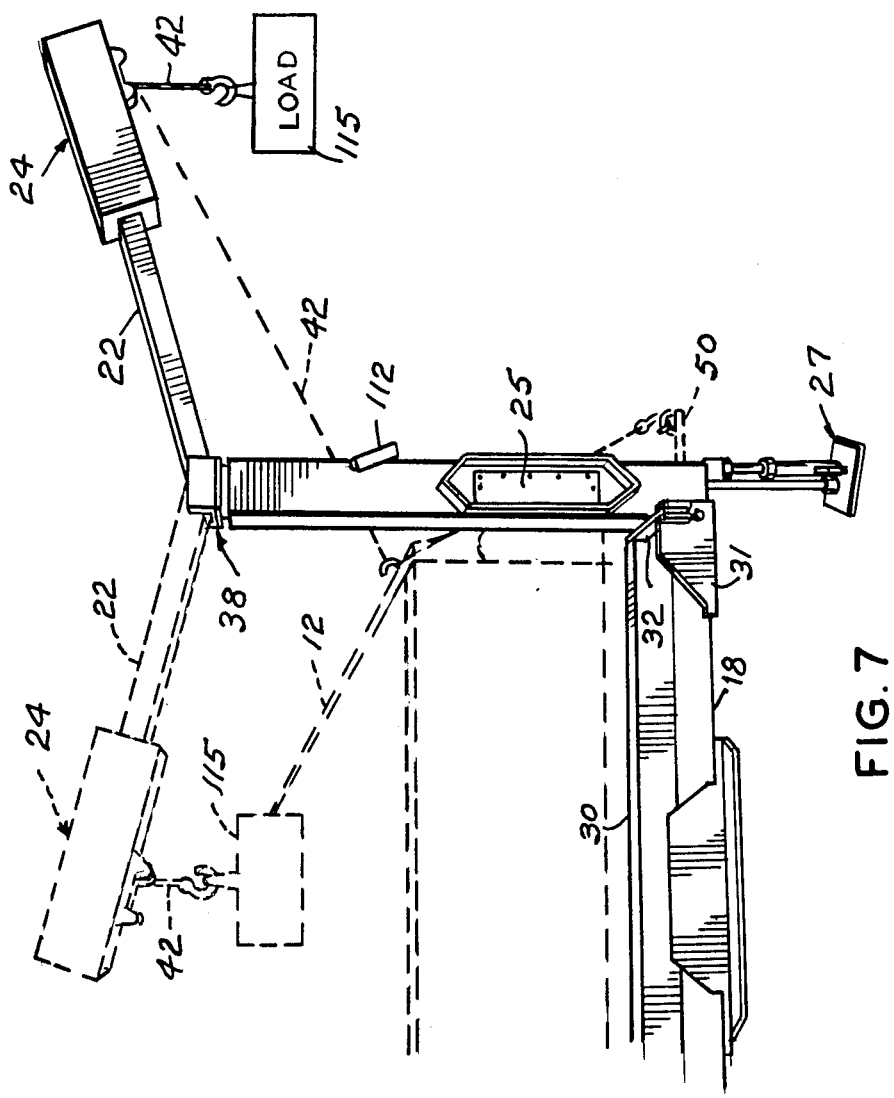
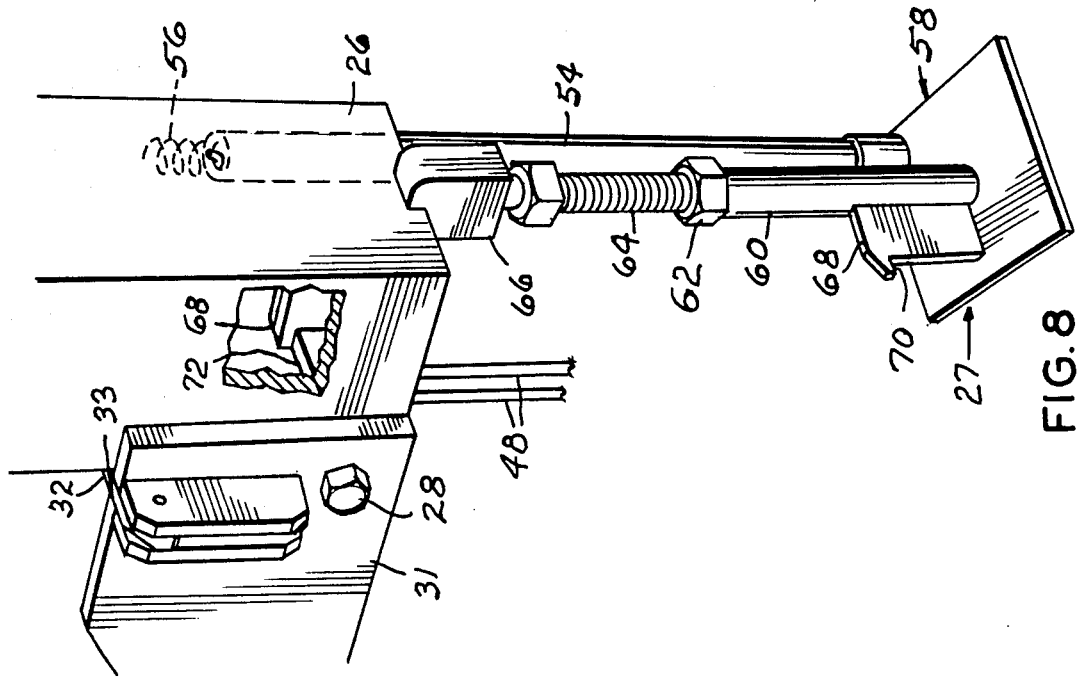

VEHICLE BUMPER STORED CRANE HOIST

BACKGROUND OF THE INVENTION

1. Field of the Invention

The present invention relates to portable power hoists and more particularly to a collapsible pickup truck bumper stored self-erected hoist.

As is well known small trucks, such as pickup trucks, are widely used for hauling articles of generally bulky shape. Such vehicles are often used for transporting material of considerable mass which require the power assistance, such as a hoist, for loading and unloading equipment or materials being moved. Unless such power equipment is available at the pick up and delivery point, it is usually necessary to have an onboard hoist. This invention provides such a hoist.

2. Description of the Prior Art.

Most of the portable or pickup mounted hoists presently in use have several disadvantages, such as the space required by the hoist interferes with the load capacity of the pickup bed or if mounted on the outside of the bed or on one of the side walls it usually interferes with the stake pockets for adding sideboards to the pickup bed side walls which requires removal of the hoist in order to utilize the stake pockets. Further, the pickup bed mounted portable hoist places undue strain on the sheet material of the pickup bed when the load is supported by the hoist.

The most pertinent prior patent is believed to be U.S. Pat. No. 4,419,038 which discloses an upwardly open box-like rear bumper shell removably receiving a base hoist column pivoting toward and away from the bumper position on a shaft at one end thereof by a motor driven winch mounted in the opposite end of the bumper for lifting the column. A boom, pivoted to the top end of the column, extends laterally of the vertical axis thereof when erected with the column and being angularly rotatable on a thrust bearing. A winch line extends through the column and bumper over pulleys therein with the boom folded against the column and when stored in the bumper. Outrigger screw operated support jacks, depending from the respective ends of the bumper support large mass loads.

This invention is distinctive over the prior art and above named patent by the structural arrangement of its components, such as a telescoping action of its boom member and a power winch elevating itself with the hoist.

SUMMARY OF THE INVENTION

An elongated tubular mast for vertical pivoting movement, is pivotally connected at one end, at the rear bumper position of a pickup truck. The other end of the mast receives a tubular boom telescoping into the mast and angularly rotatable about the mast axis. Pivot pins, on the inward telescoped end of the boom, permit the latter to project laterally of the mast at an obtuse angle when erected. The other end of the tubular boom axially supports a motor driven winch having a flexible line thereon for winding up and paying out. The folding action of the boom, with respect to the mast, permits the winch to erect the mast and boom when its line is secured to a cable anchor rod on the mast mounted end of the bumper. A support jack telescopes into and out of the bumper mounted end of the mast as a mast and load support when erected.

The principal object of this invention is to provide a telescoping self-erecting and collapsing power hoist normally stored in the rear bumper area leaving the load bed unobstructed and for moving material into and out of the bed of a pickup truck.

BRIEF DESCRIPTION OF THE DRAWINGS

FIG. 7 is a fragmentary perspective view illustrating the article loading or unloading action of the hoist;

FIG. 8 is a fragmentary perspective view of the jack in supporting position;

DESCRIPTION OF THE PREFERRED EMBODIMENTS

Figure 1:
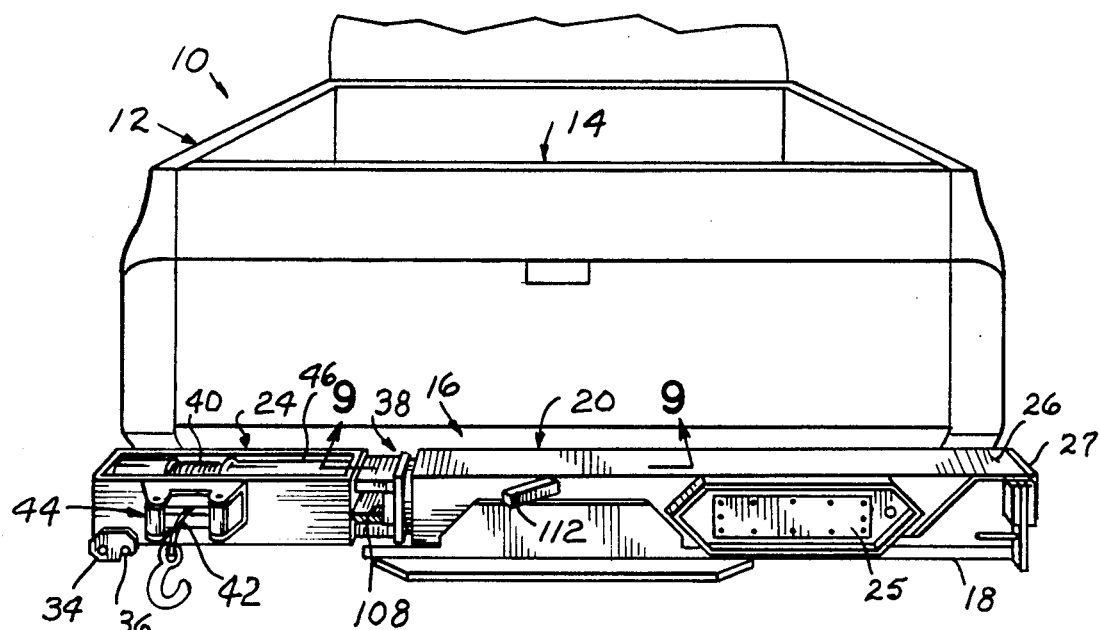
FIG. 1 is a fragmentary perspective view of the hoist in stored position in a pickup truck rear bumper area.

Like characters of reference designate like parts in those figures of the drawings in which they occur.

Figure 2:
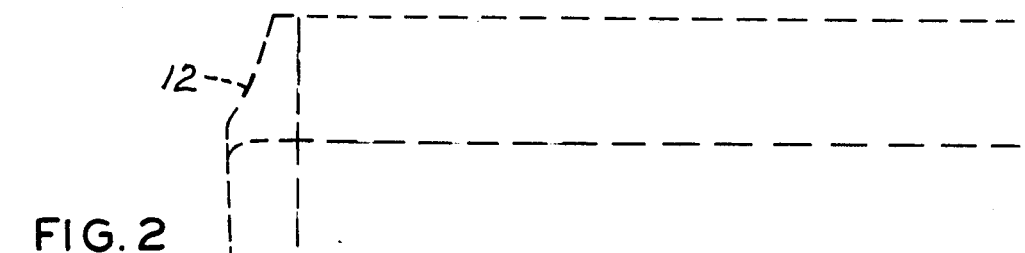
FIG. 2 is a fragmentary perspective view similar to FIG. 1 illustrating the initial position of the winch end of the hoist prior to the erecting action thereof.
Figure 3:
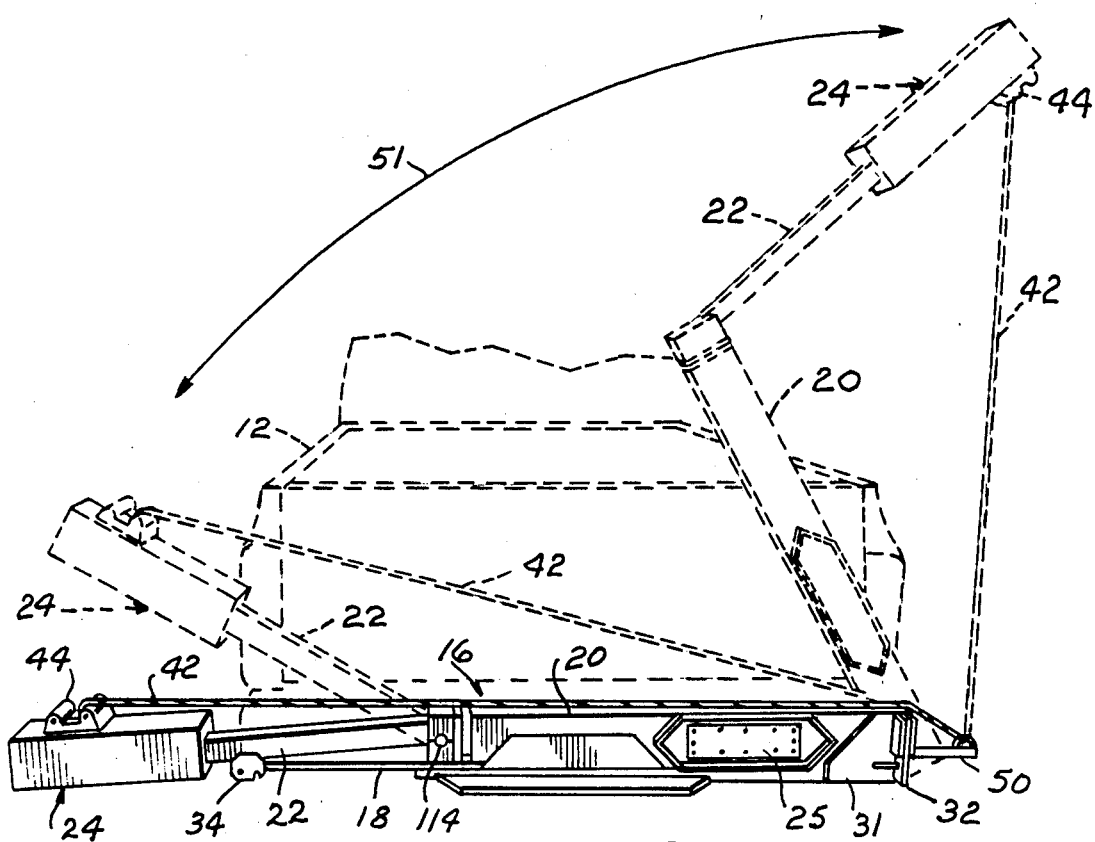
FIG. 3 is a perspective view illustrating the hoist erecting action.

In the drawings:

Referring first to FIGS. 1 to 3, the hoist unit is mounted on a conventional pickup truck 10 having an upwardly open load bed 12 and an openable tailgate 14 for easy access to the load bed.

The reference numeral 16 generally indicates the hoist which is elongated rectangular in its stored configuration and is normally disposed in the position of the pickup rear bumper rearwardly and below the limit of the tailgate 14 being supported by a rearwardly projecting horizontal flange 18. The hoist 16 principally comprises a mast 20 telescopically receiving a boom 22 which supports a power head or winch assembly 24.

Figure 5:
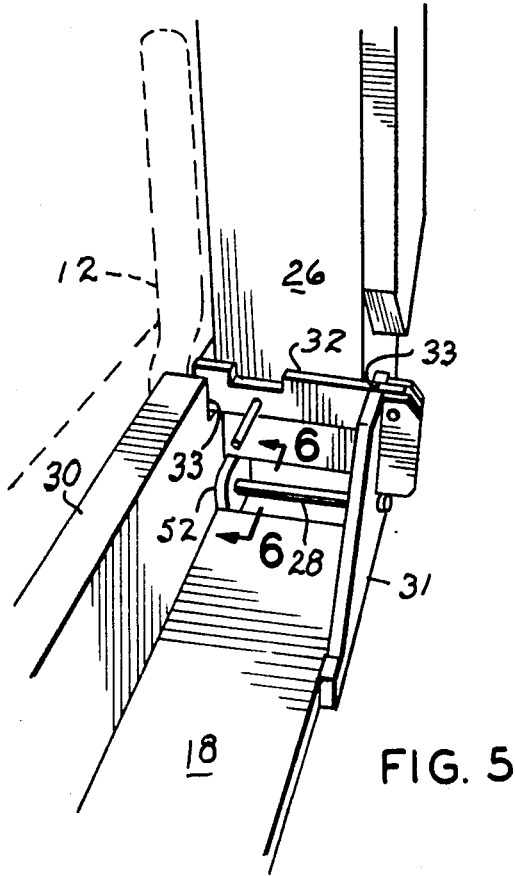
FIG. 5 is a view similar to FIG. 4 illustrating the mast lock in locked position.
Figure 4:
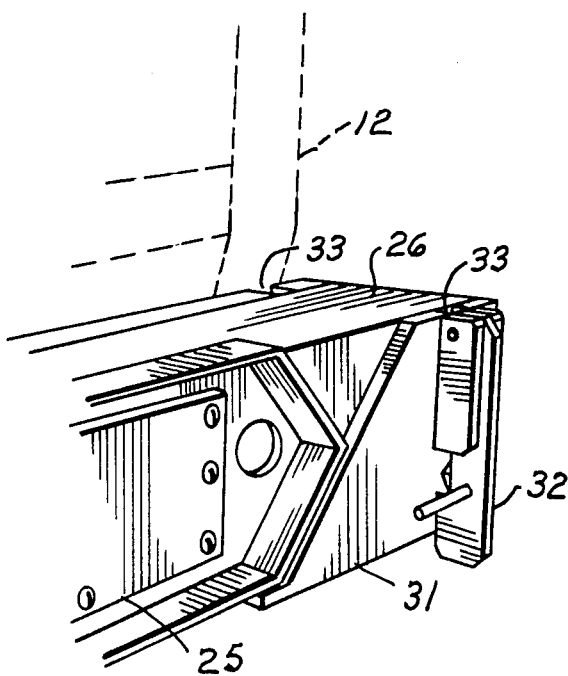
FIG. 4 is a fragmentary perspective view illustrating the stored position of the mast lock prior to erecting the hoist.

As more clearly shown by FIGS. 5 and 7, the base end portion 26 of the mast is pivotally supported by a pivot bolt 28 extending through the upright flange 30 of the angle member 18 and an upright brace flange 31 secured to the rearward edge portion of the support flange 18. A mast lock bar 32 is pivotally secured to the rearward surface of the brace flange 31 in position to pivot vertically forward about its transverse pin mounting and secure the mast in an upright position by horizontally nesting in cooperating vertical slots 33, respectively, formed in the upper edge limit of the flange 30 and brace flange 31.

In its stored position, the boom 22 is maintained telescoped into the mast 20 by a stop or latch 34 secured to the horizontal flange 18 and engaging a screw or pin 36 on the flange 18. One end of the boom 22 is pivotally and rotatably connected with the mast by a sleeve and thrust bearing assembly 38, as presently described in more detail, which permits telescoping movement of the boom into and out of the mast.

The other end of the boom axially supports the elongated power head 24 which includes winch means 40 having a cable 42 wound thereon and projecting outwardly through the cable surrounding normally rearward facing opening defined by a conventional friction reducing winch cable roller means 44. In the boom stored position the bracket, supporting the rollers of the cable roller means, abuts the latch 34 and prevents unauthorized telescopic extension of the boom. The winch is driven by a reversible motor 46 supplied with electrical energy from the pickup energizer or battery, not shown, by wires 48 extending longitudinally through the mast 20 and boom 22. Suitable motor controls, not shown, are interposed in the wires 48 for controlling the operation of the power head, as presently explained.

Intermediate its ends, the mast is provided with a longitudinal access opening normally closed by a vehicle license plate support panel 25 surrounded by an outstanding flange wall to shield the license plate illuminating lamp, not shown.

Figure 6:
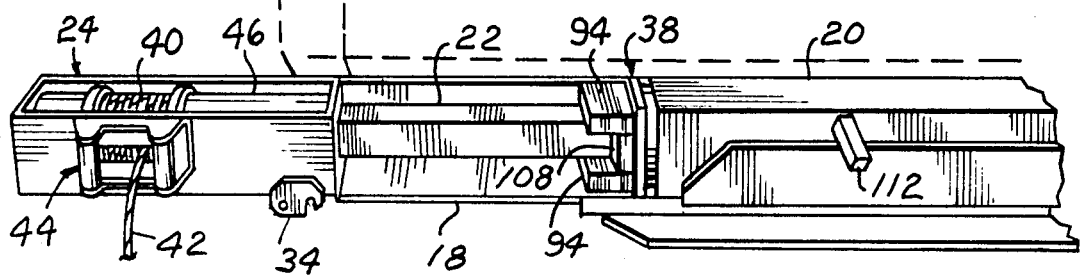
FIG. 6 is a fragmentary vertical cross section taken substantially along the line 6—6 of FIG. 5.

The hoist 16 is lifted to its erected load lifting position of FIG. 7 by manually telescoping the boom 22 out of the mast 20 so that the power head 24 projects laterally of the left side of the pickup (FIG. 3). The power head 24 and boom 22 are manually angularly rotated as a unit about its longitudinal axis to dispose the cable surrounding opening of the friction reducing roller means 44 in an upward position (FIG. 3). The cable 42 is paid out so that its hook may be engaged with a cable anchor rod 50 telescopically extended horizontally a selected distance beyond the base end portion 26 of the hoist. By operating the winch 40, the cable 42 is taken up which pivots the power head and boom in an upward direction to describe an obtuse angle with respect to the axis of the mast. Continued takeup of the cable pivots the mast and boom in an upward direction, as shown by FIG. 3, in the direction of the arrow 51 until a lug 52, surrounding the pivot bolt 28, contacts a stop 53 (FIG. 6) welded to the depending surface of the angle member 18 for its fully erected position, as shown by solid lines (FIG. 7).

With the mast secured in its upright position by the lock bar 32, as described hereinabove, the jack assembly 27 is manually released from the base end portion of the mast to support the latter. The jack assembly comprises an elongated shaft 54 supported within the mast by a coil spring 56 with the bottom end of the shaft secured to a jack base or foot 58. A tube 60, centrally mounted on the jack foot 58 threadedly supports, by a nut 62, a vertically adjustable and threaded rod 64 having a lug 66 on its uppermost end cooperatively engaging a depending edge or end surface of the mast base end. With the jack foot 58 resting on the surface of the earth, the lug 66 and its screw threaded rod 64 supports the mast and any load lifted thereby as presently explained. A jack latch, comprising a vertically disposed section of plate metal 68 secured to the jack foot and tube 60, is provided with a latch notch 70 which engages a horizontal support 72 within the mast base end portion 26 (FIGS. 6 and 8) which normally maintains the jack assembly 27 stored in the mast when not in use.

Figure 9:
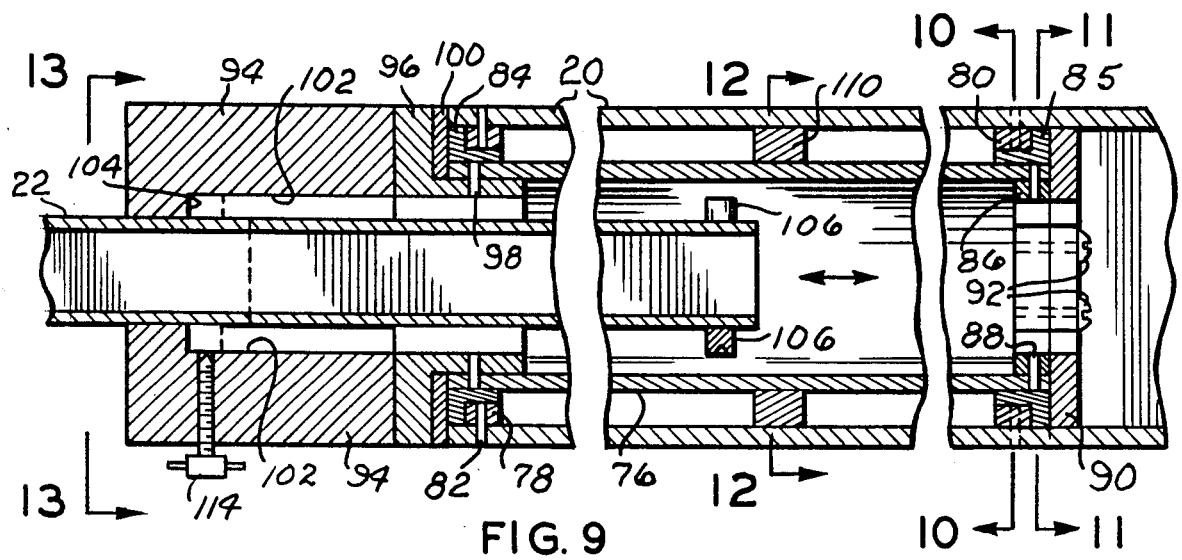
FIG. 9 is a fragmentary vertical cross section, to a larger scale, taken substantially along the line 9—9 of FIG. 1.
Figure 11:
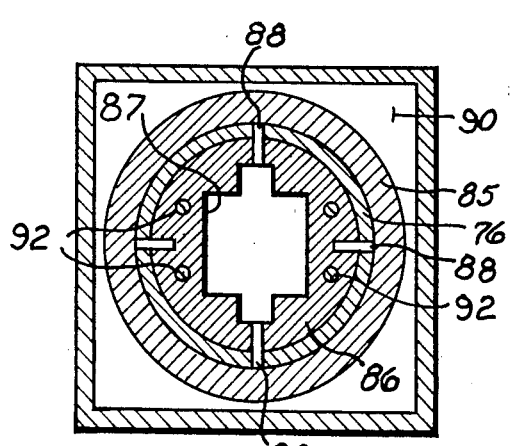
FIGS. 10, 11 and 12 are vertical cross section views taken substantially along the lines 10—10, 11—11 and 12—12, respectively of FIG. 9; and, FIG. 13 is a vertical cross section, partially in elevation, taken along the line 13—13 of FIG. 9.
Figure 10:
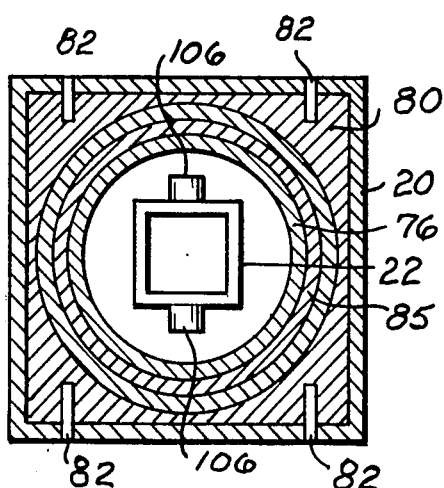
Figure 12:
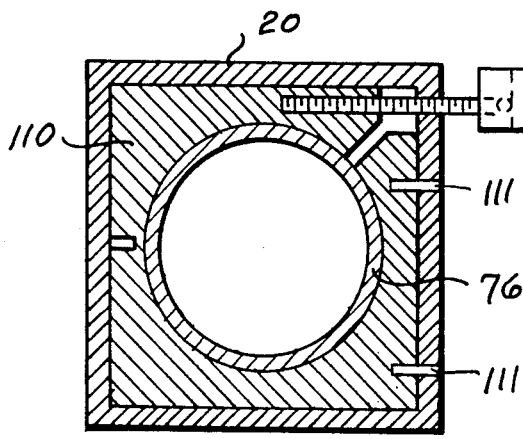

Referring also to FIG. 9, the bearing assembly 38 comprises an elongated sleeve 76, centrally disposed within the mast 20 in its end portion opposite its base end portion 26. Bulkheads 78 and 80 are cooperatively secured, as by rivets 82, to the inner surface of the mast at respective end portions of the sleeve. Right angular bearings 84 and 85 each have one annular flange interposed between the outer periphery of the respective end portions of the sleeve 76 and the bore of the respective bulkhead 78 and 80. A boom guide ring 86, centrally apertured rectangularly, as at 87, to slidably receive the inward end portion of the boom, is received by the bore of the sleeve at its innermost end portion and is similarly secured to the sleeve by rivets 88.

A similarly rectangularly apertured anchor washer 90, nested between the inner surfaces of the mast 20, abuts the innermost bearing 85 to hold the latter in place and is secured by bolts 92 to the boom guide 86.

Spaced-apart boom pivot guide flanges 94 support and guide the boom at the end of the mast 20 opposite its base end portion. The guide flanges 94 are mounted on a ring-like portion 96, similarly centrally apertured rectangularly and cooperatively projecting into the adjacent end of the sleeve 76 and is similarly secured thereto by rivets 98. A thrust bearing 100 is interposed between the ring member 96 and adjacent end surface of the bearing 84 and sleeve 76. The ring member 96, boom guide 86 and backup washer 90 central apertures are axially aligned.

The boom guide flanges 94 are each provided with a slot 102 from its inward end forming cooperating shoulders 104 for nesting transversely aligned pins 106 projecting laterally of the innermost end portion of the boom in diametric opposition. The sockets 102 thus permit pivoting movement of the boom through a 180° arc between the flanges 94. However, a boom wedge 108 is secured to the ring member 96 between the flanges 94 to support the boom, when the hoist is erected, at an obtuse angle with respect to the longitudinal axis of the mast. The mast 20 and boom 22 are shown substantially square in transverse section, however, they may be of other polygonal-shapes, as desired.

The sleeve 76 is thus journalled for angular rotation about its longitudinal axis by the bearings 84 and 85. Longitudinal outward movement of the sleeve 76, relative to the surrounding end portion of the mast 20, is prevented by the boom guide 86 being anchored to the sleeve 76 by the rivets 88 and the bolts 92 securing the anchor washer 90 to the bottom guide 86. The anchor washer 90 abuts the sleeve bearing 85 which in turn, by its outstanding flange, abuts the bulkhead 80 anchored to the mast wall 20 by the rivets 82. Longitudinal inward movement of the sleeve, relative to the mast, to the right, as viewed in FIG. 9, is precluded by the guide flanges ring portion 96 being anchored to the sleeve 76 by the rivets 98. The outstanding annular flange of the ring abuts the thrust bearing 100 in turn abutting the adjacent end of the mast wall 20 and sleeve bearings 84, the latter being in contact with the bulkhead 84 similarly secured to the mast wall 20 by rivets 82. Thus, it may be seen that the boom 22 may be angularly rotated about its longitudinal axis and the axis of the sleeve 76 when the boom is partially or fully telescoped into the mast by the periphery of the rectangular boom contacting the walls forming the aperture 87 in the boom guide 86 as well as the rectangular aperture in the ring member 96. In this action the boom 22, ring member 96, sleeve 76, boom guide ring 86 and anchor washer 90 rotate as a unit.

When the boom 22 is fully extended out of the mast (and sleeve 76) to the position where its pins 106 contact the shoulders 104 (FIGS. 3 and 7) angular rotation of the boom 22, about the vertical axis of the mast 20, is accomplished by opposing flat surfaces of the boom contacting adjacent surfaces of the guide flanges 94 and imparting torque to the ring member 96 and sleeve 76, both being journalled by the bearings 84 and 85. The mass of any load supported by the boom is supported by the thrust bearing 100.

A split sleeve clamp 110 cooperatively received by the inner wall surface of the mast 20, cooperatively surrounds the sleeve 76 to selectively prevent angular rotation of the boom 22 about the axis of the mast. The clamp 110 is suitably anchored to the mast, as by rivets 111. A rod-like handle 112 having a screw threaded end portion enters an aperture in the wall of the mast and threadedly engages the clamp adjacent its split to move a portion of the clamp in a sleeve binding action to grip the sleeve 76 by manual angular rotation of the handle 112 about its axis in one direction. The clamp is released by handle rotation in the opposite direction.

Figure 13:
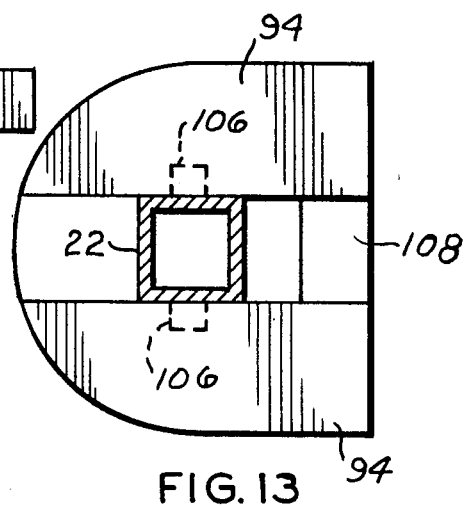

As shown by FIG. 13, the end of the flanges 94, opposite the boom wedge 108 and the adjacent portion of the flange of the ring 96, is arcuately cut-off on a radius equal to one-half the across-the-flats diameter of the mast for ease of manual angular rotation of the stored boom.

Operation

Assuming the hoist 16 is assembled and disposed in stored position on the bumper flange 18, as shown by FIG. 1. The boom latch member 34 is released and the boom and winch are longitudinally extended out of the mast (FIG. 3). The winch line 42 is payed out and connected with the extended cable anchor rod 50. A thumb screw 114, in one of the boom guide flanges 94, is tightened to enter a cooperating recess formed in the adjacent boom pivot pin 106 for the purpose of preventing inward telescoping action of the boom 22 relative to the mast during the initial hoist lifting action. Winch electrical controls, not shown, interposed in the wiring 48 (FIG. 8), are operated to energize the winch motor 46 and wind up the winch line 42. Winding up the winch line progressively lifts the hoist as a unit, as illustrated by the dotted line action, in the direction of the arrow 51 (FIG. 3). When the mast reaches its vertically erected position, the stop 53, contacted by the lug 52, arrests the action of the winch which is de-energized by the controls. The mast lock bar 32 is pivoted to its mast lock position (FIG. 5). The jack assembly 27 is then released and disposed in mast supporting relation, as described hereinabove. The hoist is then ready for lifting a load 115 from the surface of the earth to the pickup bed or vice versa in which the winch is operated in a conventional manner, the boom supported load being swung by manually rotating the mast connected end of the boom about the axis of the mast.

When the hoist is to be lowered to its stored position, the hoist is disposed in its solid line position of FIG. 7 with the winch line 42 connected with the cable anchor 50. An intermediate portion of the winch line is engaged over a hook 120 supported by the upper limit of the adjacent rearward end portion tion of the pickup bed side wall. The mast lock bar 32 is pivoted back to its stored position and the winch operated in a line takeup action which pulls the hoist toward its stored position to the left, as viewed in FIG. 7. When the hoist is disposed laterally, to the left, of the position of the hook 120, a gradual paying out action of the winch line 42 slowly lowers the hoist to its solid line position of FIG. 3. The thumb screw 114 is released from contact with the boom pivot mounting pin 106 to permit the boom to be manually telescoped into the mast or power moved thereinto by a winch takeup action of its line 42 while connected with the cable anchor 50.

Obviously the invention is susceptible to changes or alterations without defeating its practicability. Therefore, I do not wish to be confined to the preferred embodiment shown in the drawings and described herein.

I claim:

1. In a mobile vehicle having a load supporting platform, an electrical system a source of electrical energy and having a rear bumper structure, the improvement comprising:
    telescoping hoist means including a boom and mast means pivotally connected with one end of the bumper structure for vertical movement as a unit about a horizontal axis from a horizontal bumper stored position to an upright mast with boom extended operating position;
    jack means telescopically extended from the pivotally connected end portion of the mast when erected upright for supporting a hoist means carried load from the end of the boom;
    power winch means including a motor mounted on the free end portion of said boom and operatively connected with the vehicle source of electrical energy for a hoist means self-erecting action; and,
    cooperating stop means at the pivotally connected end of the mast for interrupting the hoist self-erecting action when the axis of the mast reaches the vertical.

2. The combination according to claim 1 in which the boom and mast means includes:
    a mast having a base end and a longitudinal length at least equal to one-half the transverse width of the vehicle but less than the full width of the vehicle; and,
    a boom telescoping out of the mast prior to erecting the hoist and pivotally joined with the mast in a manner to extend laterally and upward at an obtuse angle with respect to the longitudinal axis of the mast when erected.

3. The combination according to claim 2 and further including:
    sleeve and thrust bearing means in said mast journalling said boom for angular rotation about its longitudinal axis when telescoped into the mast and angular rotation about the longitudinal axis of the mast when disposed at said obtuse angle.

4. The combination according to claim 3 in which the stop means includes:
    mast stop means secured to the mast adjacent its horizontal pivoting axis for engaging the adjacent end portion of the bumper structure when the mast is vertically disposed.

5. The combination according to claim 4 in which the stop means further includes:
    lock bar means interposed between the mast and the bumper structure for preventing unauthorized pivoting action of the mast toward the bumper structure.

6. The combination according to claim 5 in which the power winch means includes:
    a winch having a drum;
    a reversible motor having its drive shaft operatively connected with said winch;
    a cable wound on said drum and having a free hook equipped end; and,
    anchor rod means extendible beyond the pivotally connected end portion of said mast for anchoring the cable hook end during the hoist self-erecting action.

* * * * *